2 Sheets—Sheet 1.
O. ZWIETUSCH.
SODA-WATER APPARATUS.
No. 187,446. Patented Feb. 13, 1877.
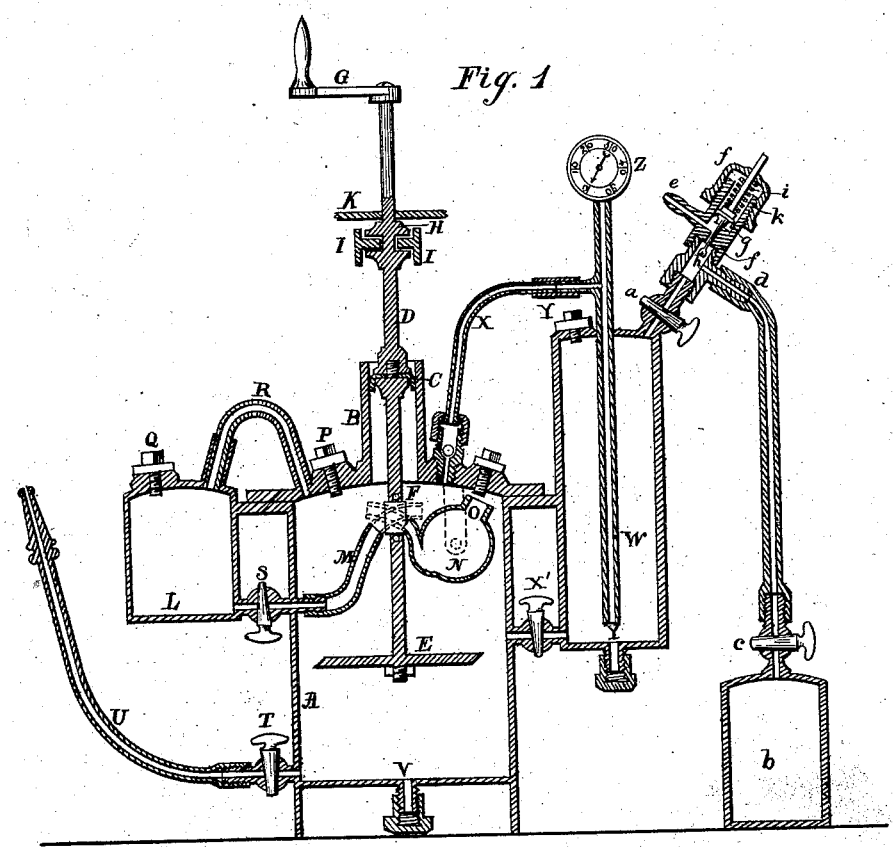
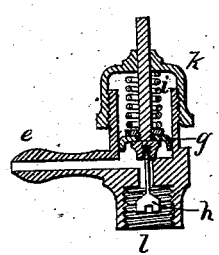
Witnesses:
Edward E. Borgnis.
John G. Hirsch
Inventor:
O. Zwietusch
N. PETERS, PHOTO-LITHOGRAPHER, WASHINGTON, D. C.

O. ZWIETUSCH.
SODA-WATER APPARATUS.

No. 187,446.                     Patented Feb. 13, 1877.

Witnesses:
Edward E. Borgnis
John G. Hirsch

Inventor:
Otto Zwietusch

UNITED STATES PATENT OFFICE.

OTTO ZWIETUSCH, OF MILWAUKEE, WISCONSIN.

IMPROVEMENT IN SODA-WATER APPARATUS.

Specification forming part of Letters Patent No. 187,416, dated February 13, 1877; application filed January 3, 1876.

*To all whom it may concern:*

Be it known that I, OTTO ZWIETUSCH, of Milwaukee, Wisconsin, have invented certain new and useful Improvements in Soda-Water Apparatus, of which the following is a full, clear, and exact description, reference being had to the accompanying drawings, making a part of this specification, in which—

Figure 3:
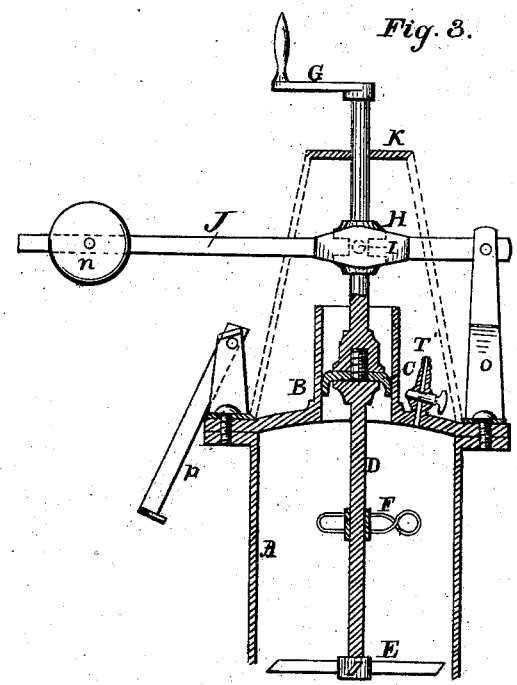
Figure 4:
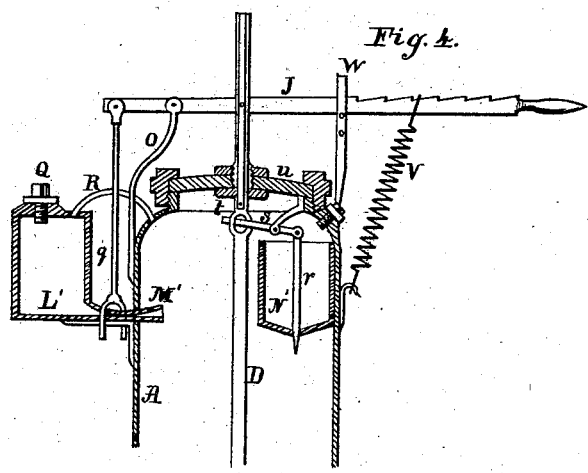

Figure 1 is a vertical section of my invention. Fig. 2 is a sectional view of the pressure-equalizer. Fig. 3 is a section, showing parts not shown in Fig. 1. Fig. 4 is a sectional view, showing arrangement of parts operating rod D.

The object of my invention is to make a new apparatus which serves for the triple purpose, namely, to make soda-water, to preserve beer, and to act as a chemical fire-extinguisher, for each of which purposes a separate and different machine has heretofore been used.

This result is obtained by the peculiar construction of the machine, as I may use it for any of the above-named purposes exclusively, or for any two of them, or for all three at the same time, with one charge, by means of a self-regulating liquid-adding arrangement, by the automatical mixing of the chemical ingredients, and by the two self-regulating pressure arrangements, piston-weights, and equalizer, as hereinafter will be described.

In the drawings, A is the generating-chamber, which may be made of any suitable material. B is the cover, with a cylindrical opening at the top. C is the piston, that moves in the cylinder extending on cover B, having its packing tightly closed by the internal produced pressure. D is a rod, which is moved out and inward—outward by an internal pressure, and inward by weighted lever J, to which piston C is connected. It has an agitator, E, at the bottom, a crank, G, at the top, and a groove, H, between the crank G and piston C, in which pins I of the lever J are situated, working in a manner that the rod D is allowed to move up and downward, and permitting, at the same time, the revolution of said rod. K is the guide for rod D. L is a vessel, connected with generating-chamber A on the outside, and made of material that will withstand acids, having a flexible outlet, M, extending through swivel F in the interior of generating-chamber A, which allows the outflow of the acid as soon as it is brought below the level of the liquid contained in said vessel, which outflow is stopped as soon as it is brought above the level by means of rod D. N is a tilting vessel inside of generating-chamber A, pivoted in hangers which are attached to cover B, N having an inlet and a bended outlet, which extends through swivel F, and through which the contents of the vessel is allowed to flow as soon as the outlet is brought below the level of the liquid, and stopped again when brought above its level by rod D. O is the inlet for vessel N, which is closed by a block-screw. P is the inlet to generating-chamber A; Q, inlet for vessel L; R, equalizing-pipe from generating-chamber A to vessel L; S, stop-cock between generating-chamber A and vessel L; T, outlet and cock, which permits the escape of the liquid from generating-chamber A, when used for the purpose of extinguishing fire. U is a hose with nozzle attached, used for the purpose of conducting the liquid from generating-chamber A. V is the outlet for refuse of generating-chamber A. W is the gas-purifier; X, the outlet-pipe from generating-chamber A to purifier W, having a small check-valve, which prevents the water from running back; X', the stop-cock through which the contents of purifier W can be led into the generating-chamber A. Y is the inlet through which the purifier W is filled; Y', the outlet for refuse of purifier W; Z, the gage for indicating the pressure. $a$ is a cock on purifier for the outlet or escape of gas. $b$ is a gas reserve or fountain; $c$, a stop-cock on gas-reserve; $d$, joint and outlet on same to gas-reserve; $e$, outlet of pressure-equalizer, from which gas is led to the beer-casks described in Fig. 2.

Fig. 2 is a sectional view of the pressure-equalizer, which consists of piston $g$, (constructed same as piston C,) vent $h$, spring $i$, screw-cap $k$, inlet $l$, and outlet $e$.

Fig. 3 is a sectional view, having following parts not shown in Fig. 1. T' is an escape-cock for gas, which is to be used for the purpose of extinguishing fire. F is a swivel, which holds and carries the outlet of vessels L and N. E is an agitator having twisted wings. J is a lever looped in the center, and in which pins I project. K is the guide for rod D; $n$, weight which is attached to lever J; $o$, supporter (bails) for lever J; $p$, brace which is placed beneath lever J to bring apparatus out of action.

Fig. 4 is a sectional view, showing the manner in which rod D is operated, with a rubber cover, that may be substituted for the piston C. L' is the vessel, having a flexible outlet, $m'$, from which the flow of the liquid is regulated by means of rod D, which causes a fork, $q$, to press on the flexible outlet, thereby stopping the flow, which is opened again when it is released therefrom. N' is a vessel, closed by a plunger, $r$, which is connected to rod D by lever $s$ through slot $t$. $u$ is a rubber cover, suitably attached, to which rod D is connected. $v$ is a double-rolled spring, which may be substituted for weight $n$. $w$ is the guide for lever J.

To operate this machine it is charged with sulphuric acid and bicarbonate of soda dissolved in water; but any other acid or carbonate may be substituted. To fill it, brace $p$ is placed beneath lever J, so that the outlet of vessels L and N are brought up above the level of the contents, whereby the outflow is stopped. Strong acid or acid diluted with water is put into vessel L through opening Q, and bicarbonate of soda and water into generating-chamber A through opening P; or acid may be put into either of the vessels L and N and carbonate solution in the other. Then water, with a part bicarbonate of soda, is put into the purifier W. It is an advantage to put bicarbonate of soda into purifier W, for should any acid part be carried over into it, it will there be neutralized immediately by coming in contact with the water saturated with the soda, and thus prevented from passing into the cask containing the beer, or into the fountain which is to be charged. By allowing lever J to sink downward, previously properly weighted with weight $n$, the ingredients of the respective vessels will flow out and come in contact in generating-chamber A, whereby carbonic-acid gas is immediately generated, and as soon as the desired pressure is obtained, agitating-rod D is carried outward through this medium by acting from the interior against piston C, Fig. 1, or cover $u$, Fig. 4, causing the flow of the liquids contained in the respective vessels to cease. As soon as the pressure diminishes, the weighted lever presses downward upon rod D, allowing the liquids to flow again, and while rod D moves up and downward the contents below are stirred by the wings E, as shown in Fig. 3, and by this performance an automatical mixing of the chemical materials, as also an automatic-acting pressure-regulation, is obtained. The machine can then be used for the following purposes:

1. As a soda-water apparatus. In using it as such, connect a fountain to outlet $d$, properly filled with water, having valve $h$ closed in pressure-equalizer $f$. By bringing spring $i$ out of action, to raise the necessary gas, lever $j$ is pressed downward, whereby a greater quantity of liquid flows into generating-chamber A, which is agitated well by turning crank G on rod D, the result of which will be a high pressure in a very short time, that is led off to the fountain till sufficiently charged.

2. As a beer-preserver. To preserve or draw beer or any other fermented liquid, I convey the carbonic-acid gas to the upper surface of the beer, so as to prevent the entrance of atmospheric air into the cask. No such high pressure is needed as when used for the purpose of making soda-water, and the pressure here being regulated by attaching more or less weight $n$ to lever $j$; but as a higher pressure than that which is required for the preserving and draft of the beer will sometimes be contained in the apparatus—for instance, just immediately after charging soda-water—then I use the pressure-equalizer $f$. (Shown in Fig. 2.) This pressure-equalizer works as follows: Inlet $l$ is connected to the high-pressure-containing chamber, outlet $e$ to the pipe leading to the beer-cask. The self-closing piston $g$, to which the vent-plug $h$ is fastened directly, is pressed downward by spring $i$, which opens the vent $h$, so that the gas can pass through this and outlet $e$ to the surface of the beer. As soon as a desired pressure is in the beer-cask, the gas will press the piston $g$ backward, so that vent $h$ is closed by the plug, and no more gas is allowed to pass through same to the beer. As soon as beer is drawn, or the pressure in the cask is diminished, piston $g$ is pressed down by a spring, $i$, and vent $h$ opened again, and continued open until it is closed by the counterpressure from the cask. More or less pressure for the beer may be obtained through the medium of cap $k$, in screwing it down more or less, and by this arrangement a constant and equal pressure of gas is always on the beer, no matter what pressure the supplying-vessel holds. By using this apparatus to carry and press the beer from one story to another, which is now done extensively, and mostly by air-pumps or hydraulic pressure, a somewhat greater power— about seven to ten pounds to the square inch—is necessary; and to press the beer up without interruption, even when the materials in the generator give out, then I use the gas reserve or fountain $b$. (Shown in Fig. 1.) This gas-reserve $b$ is filled with gas immediately after the apparatus is charged by opening cocks $a$ and $c$. When the gage Z shows a pressure of about one hundred pounds to the square inch, the reservoir is sufficiently filled; then close cock $c$, and hold it closed until the materials of the generator are exhausted, when cock $a$ is closed and cock $c$ is opened; the beer will then be supplied from the gas-reserve while the generator is being refilled.

3. As a fire-extinguisher, the contents or the product therefrom may be used in three different ways, as follows: It is necessary to fill only one vessel with acid. The water and soda are put into generating-chamber A through opening P. When there is danger of any fire, press down lever J, or attach spring $v$ to it to keep it down, that the acid may be allowed to run down into generating-chamber, and turn at crank G to agitate and mix the chemical ingredients below thoroughly. It is of great value to agitate it, for it is saturated then with carbonic-acid gas quicker and better, which is not the case with other fire-extinguishers, where the acid is simply added to the bicarbonate-of-soda solution. I consequently obtain with the same material as others use a better carbonated liquid, and in shorter time. By opening cock T, the contents will discharge and may be used. It can further be operated as a chemical fire-extinguisher, without any interruption, by putting cocks on equalizing-pipes R and X, so that the two outside vessels L and W may be shut off from the generating-chamber A. As soon as the two mentioned vessels are empty, close their respective cocks which lead their contents to generating-chamber A, and the two proposed cocks in R and X, fill the tank L with acid of standard strength or diluted, and put water and soda into purifier W. During this time the contents of generating-chamber can escape. After it has escaped, open the respective cocks of vessels L and W, when it is again ready for use, and an uninterrupted and steady working is obtained by this arrangement. To use the machine in another manner as a fire-extinguisher, gas-outlet $T^1$ (shown in Fig. 3) is necessary, and a high and constant pressure of carbonic-acid gas is required to extinguish the fire. It is known that no fire will burn when atmospheric air contains a certain per cent. of carbonic-acid gas. Often the fire is in small apartments, or between the walls, floor, or roof, &c., where it cannot easily be reached with water; and when it is used, damage is done by it, and sometimes to a large extent. By having a small hole, into which the nozzle of the discharge-tubing connected on cock T' can be led, the apartment or place will be filled with carbonic-acid gas, and the fire oppressed and extinguished without the use of water.

4. As a soda-water apparatus and beer-preserver, charge a soda-water fountain as described in 1, and preserve the beer with the carbonic-acid gas coming through pressure-equalizer $f$. When the fountain is charged, the remaining gas in the generator is used continually for the beer, which gas is most generally lost when a fountain is charged in the ordinary way.

5. To use it as a soda-water apparatus and chemical fire-extinguisher, charge the fountain as described in 1, and in case of fire, simply open cock X' on purifier W, to let the water containing soda enter the generating-chamber A; press down lever J, and turn on crank G, so that the acid and soda and remaining materials of generating-chamber are well mixed and agitated. When sufficient pressure is obtained, let lever J move upward and open cock T to extinguish the fire.

6. As a beer-preserver and chemical fire-extinguisher. As a beer-preserver, use as described in 2, and in case of fire as described in 5.

7. To use it for the triple purpose as a soda-water apparatus, beer-preserver, and chemical fire-extinguisher, attach first the soda-fountain in place of gas-reserve $b$, charge it as described in 1, lead the gas for the beer through pressure-equalizer $f$, properly regulated, and when the fountain is charged, disconnect it and place gas-reserve $b$ in its stead. In case of fire, operate the machine as described in 5, and if carbonic-acid gas is wanted for extinguishing purposes, and the materials are exhausted, refill same as described in 3.

In the above descriptions, it will be seen that gas is taken and used for several purposes, and the remaining materials for the purpose of extinguishing fire. Acid is continually in one chamber and water and soda in the other, which, when coming together, is sufficient to drive out the whole contents of the generating-chamber. Another valuable advantage contained in this machine is, that it being continually used and charged, and that the parties handling and operating it are thoroughly acquainted and familiar with its operation and working, thus have confidence in it, and in case of a fire are not afraid to use it, and know what is to be done; where, on the contrary, it is often the case that other extinguishers stand in a corner untouched for years, and, when accident of fire happens, are not confidently handled, not knowing how they are operated.

This apparatus can also be built so that one or more vessels of L or L' are attached to the outside of generating-chamber A, or one or more of vessels $n$ or $n'$, inside of generating-chamber A, the outlet of which and their flow being governed by rod D. The double-rolled spring $v$ (shown in Fig. 4) I use if a high pressure is wanted in the apparatus, and where but a short motion of rod D is necessary to shut the outlet of the acid-vessel, or also use it for fire-extinguishing purposes, as is described in 1. The spring is a double-rolled one, whereby it receives double strength, and is more durable than a single-rolled one. The eyes on the ends cannot open, as on one end it is solid, and the other made strong, in an easy manner. The ends on a single-rolled spring easily open, bend, or break, and then the first coil gives out; it extends itself easily, which is avoided in this one, as the power always lies on the eyes and spring centrally.

Having thus described my invention, what I claim as new, and desire to secure by Letters Patent, is—

1. In a carbonic-acid-gas generator, or a chemical fire-extinguisher, the self-regulating arrangement, composed or consisting of the in and outward moving rod D, by means of a piston, C, or its equivalent, in combination with one or more liquid-holding vessels.

2. A carbonic-acid-gas generator in which the acid is added to the carbonate, or both poured together by bringing the outlets of the liquid-containing vessels below their level, and the adding of which is stopped when the outlet is brought above their level by the within produced pressure, as specified.

3. Gas reserve or fountain b, in combination with a carbonic-acid-gas generator so arranged that, by drawing beer with carbonic-acid gas, the beer receives the gas from said gas-reserve, during which time the generator is refilled, and there is no interruption in drawing the beer, as specified.

4. In combination with a soda-water apparatus, the pressure-equalizer f, (shown in Fig. 2,) consisting of inlet l, outlet e, in combination with self-tightening or closing piston g, vent h, spring i, and cap k, for the purpose herein set forth.

5. In a carbonic-acid-gas generator, an agitator, E, in combination with rod D, which works up and downward, and which is so arranged that it may be revolved at the same time, as specified.

6. On a carbonic-acid-gas generator, in combination with the generating-chamber A and purifier W, connecting-cock X' between chamber A and purifier W, to allow the contents of purifier to run into generating-chamber at will, as specified.

7. Lever J, in combination with pins I, and the groove H, and rod D, as specified.

8. Tilting vessel N, in combination with swivel F and rod D, as specified.

9. Vessel L, flexible outlet M, (shown in Fig. 1,) in combination with swivel F and rod D, as specified.

10. Rod D, in combination with crank G, swivel F, and agitator E, as specified.

11. Rod D, in combination with bail o, lever J, brace p, and weight n, as specified.

OTTO ZWIETUSCH.

Witnesses:
JOHN G. HIRSCH,
FR. A. VOLKMANN.